March 21, 1967  LE ROY R. VIEREGGE  3,309,775

VERNIER TOOL

Filed May 6, 1964

INVENTOR.
LeRoy R. Vieregge
BY
Townsend and Townsend
attorneys

United States Patent Office 3,309,775
Patented Mar. 21, 1967

3,309,775
VERNIER TOOL
Le Roy R. Vieregge, 1885–79 E. Bayshore Road,
East Palo Alto, Calif. 94303
Filed May 6, 1964, Ser. No. 365,459
1 Claim. (Cl. 33—143)

This invention relates to a precision measuring device, and more particularly to a measuring device having separate vernier scales for use in making different dimensional measurements.

The vernier calipers have long been used to make precision measurements. Heretofore, many of these vernier calipers were limited in use to making certain measurements, such as the outside dimension or diameter of an object, the inside dimensions of an object, or the depth.

Accordingly, an object of this invention is to provide a vernier type measuring device which can be used to measure outside dimensions of objects, depths of apertures and inside dimensions of apertures.

The related object is to provide a vernier measuring device having an extensible main scale with a foot formed on one end and including first and second vernier scales fastened adjacent to the side edges of the main scale, each vernier scale being longitudinally displaced relative to the other so that the fiducial or zero mark of one vernier scale is adapted to align with the zero calibration mark on the main scale when the outermost end of the main scale is fully retracted and flush with relation to a reference surface, or edge, and wherein the fiducial or zero mark on the second scale is adapted to align with the zero calibration mark on the main scale at such times as the outermost edge of the main scale foot is extended beyond the reference surface a distance equal to one width of the scale foot, whereupon the innermost foot edge is coextensive, or flush with the reference edge.

An advantage of having the two longitudinally displaced vernier scale resides in the fact that the first of said vernier scales can be used for making inside or depth measurements, and the second of said vernier scales can be used for making measurements of the outside dimensions or diameters of objects.

Other objects, features, and advantages of this invention will become apparent by reading the following detailed description and referring to the accompanying drawings in which.

Figure 1:
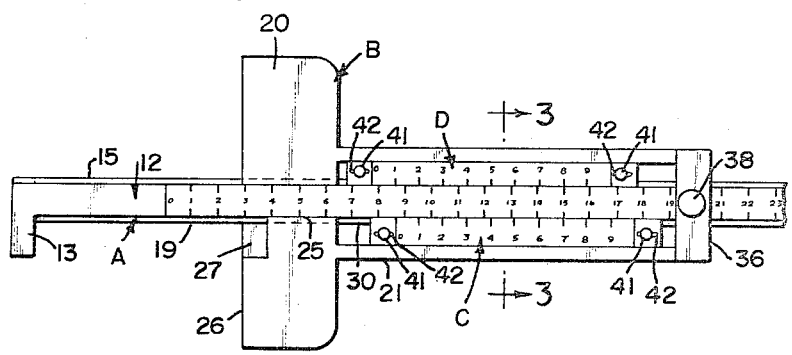
FIGURE 1 is a plan view of the vernier scale measuring device showing the footed scale in an extended position.

There is illustrated generally in FIGURE 1 a footed scale blade A mounted for extension and retraction relative to a main frame B. A pair of vernier scales C and D are mounted or fastened along the upper and lower edges of the sliding main scale with the zero or fiducial mark on each vernier scale being displaced longitudinally from the other so that one vernier scale can be used for inside dimension measurements and the other vernier scale can be used for outside dimension measurements.

Referring now to the details of the invention, there is provided a main scale A having a calibrated blade 12 with a generally rectangular foot 13 depending from one end thereof. Each longitudinal edge of calibrated blade 12 is rabbeted at 19 and 15 for reciprocal sliding movement within a slot formed in support frame B as will be explained.

Figure 2:
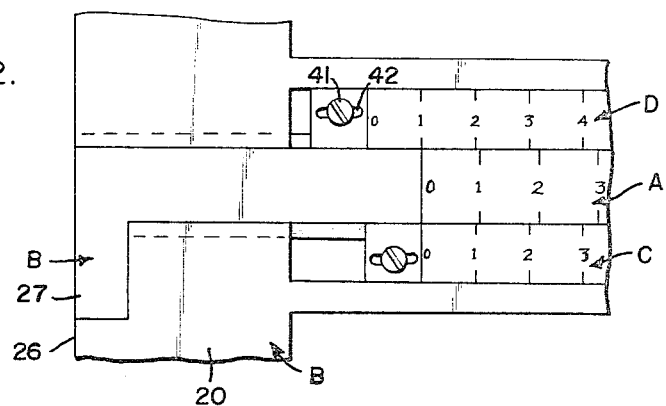
FIGURE 2 is an enlarged fragmentary plan view of the vernier scale measuring device showing the footed scale in the fully retracted flush position showing the relationship of the vernier fiducial marks to the zero calibration mark on the main scale.
Figure 3:
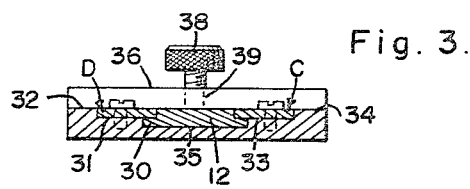
FIGURE 3 is an enlarged cross-sectional view of the scale portion of the invention taken along the lines 3, 3 of FIGURE 1.

Frame B is generally T-shaped having a reference block 20 secured to the end of a scale frame 21 which scale frame in turn extends longitudinally at a right angle from reference block 20. In order to provide a path for sliding movement of the footed scale blade A, both reference block 20 and the scale support frame 21 are formed with a slot having a dimensional tolerance slightly greater than the dimensional tolerance of the scale blade thereby providing for sliding motion of blade 12 within frame B. The position of the slot 25 in reference block 20 is T-shaped and extends normal to reference edge or surface 26 of reference block 20, thereby insuring that a right angle measurement from the outermost end of scale A and the reference surface 26 is accurately indicated by the measurement indicia on the scale blade 12 and one of the vernier scales. That portion of T-shaped slot 25 nearest the reference surface 26 is enlarged on one side to provide a recess 27 for the rectangular foot 13 when the scale and foot are fully retracted as indicated in FIGURE 2.

Referring now to vernier scale support frame 21, the groove 30 formed longitudinally along the upper surface is no longer T-shaped, but is plowed out to form stairstep lands 31 and 32 on one side and matching stairstep lands 33 and 34 on the other side thereof. The lower surface 35 of the slot is sized to receive the widest portion of main scale blade 12 for slidable movement therein. A cross member 36 extends across slot 30 at the end of scale support frame 21 and is connected or secured to the lands 32 and 34 by means of welding or any other conventional fasteners. In order to lock the scale blade 12 in place, a knurled locking screw 38 is threaded through an aperture 39 in cross member 36 so that tightening the screw down urges the screw tip against the upper surface of the blade 12, thereby frictionally locking the scale in the desired position.

A pair of vernier scales C and D are fastened adjacent the lower and the upper longitudinal edges of scale blade 12. Each of these vernier scales is fastened to the top of stairstep land 31 and 33 respectively by means of the flathead screws 41 extending through slotted aperture 42 which are located at the ends of each vernier scale. With the fastening connections afforded by the slotted aperture, each of the vernier scales can be slidably adjusted relative to the main scale in order to provide near perfect alignment of the fiducial mark on the vernier scale and the zero calibration mark of the main scale. It should be noted that the fiducial marks on the upper vernier scale and the lower vernier scale are displaced longitudinally from one another a distance equal to the width of scale foot 13. In addition the edges of each vernier scale extend over the rabbeted edges 19 and 15 to hold main scale blade 12 in position in the slot and prevent warping.

In operation, the zero calibration mark on the main scale blade 12 is aligned with the fiducial mark of lower vernier scale C at such times as the outermost edge of scale foot 13 is coextensive with the plane of the reference edge 26. Thus, an extension of the footed scale A into an aperture will give an indication of the depth of that aperture by reference to the alignment of the vernier marks on lower vernier scale C and the measurement indicia or marks on the main scale blade 12. As previously mentioned, the fiducial mark on the upper vernier scale D is displaced longitudinally from the fiducial mark on the lower vernier scale C, a distance equal to the width of scale foot 13. As a result the zero calibration mark on the main scale 12 is adapted to align with the fiducial mark on the upper vernier scale D at such times as the inner edge of scale foot 13 is coextensive with the plane of reference surface 26 on reference block 20. Thus by extending the main scale sufficiently far beyond the reference surface 26, to embrace the outside dimensions of an object between the inner edge of scale foot 13 and reference surface 26, a measurement of the outside dimension of the object can be obtained.

It is also possible to obtain an inside diameter or dimension measurement of an aperture by judicious use of the two vernier scales. All that is necessary is a first measurement of the wall thickness of an object by embracing the object wall between the inner edge of foot 13 and the reference surface 26 to get a measurement indication on upper vernier scale D in the manner previously described. Next main scale 12 is extended sufficiently so that the outermost edge of scale foot 13 touches the opposite edge of the aperture thereby obtaining, on lower vernier scale C, a measurement from the outside surface of the object to the opposite wall of the aperture. By then taking the difference of these two readings the wall thickness is accounted for and a measurement of the inside dimension of an aperture is readily obtained.

Although one embodiment of this invention has been described in detail for purpose of explanation, other changes can be made in the invention as are obvious to a man ordinarily skilled in the art and that the applicant's invention is limited only by the scope of the appended claim.

What is claimed is:

A precision measuring device comprising: a blade calibrated on one surface and having a rigid body including a pair of longitudinal edges, a pair of elongated ribs secured to and extending along respective longitudinal edges, said body being further provided at one end thereof with a foot rigid to and extending laterally from one of said longitudinal edges; a pair of rigid elongated vernier scales; a generally T-shaped frame, said frame comprising a reference block and a scale supporting frame extending perpendicularly therefrom, said reference block having a reference edge and slot extending transversely of said block and opening with said reference edge, said slot defined by a pair of spaced edges, each spaced edge having an undercut groove for slidably receiving a respective rib of said blade, said scale supporting frame having a groove defining a longitudinally extending planar portion aligned with said slot and of a width equal to that of the blade and ribs and stepped upstanding edge portions extending the length of the scale frame, said vernier scales being adjustably secured to the stepped portions such that they overhang a portion of the central planar portion, said overhanging portion of the vernier scales and said groove defining a further slot for slidably receiving the ribs of the blade, and an end section transversely spanning the scale frame at the end of the scale frame opposite the reference block and having locking means thereon for securing the blade in adjusted positions, said reference block being further provided with a recess at said reference edge and opening into the slot for receiving the foot, said foot having a pair of faces parallel to said reference edge; said vernier scales each having a calibrated upper surface co-planar with said one surface of said blade, the first of said vernier scales having a fiducial mark adapted to align with the zero calibration mark on said blade when one of said foot faces is aligned with said reference edge, the second of said vernier scales having a fiducial mark adapted to align with the zero calibration mark on said blade when the other of said foot faces is aligned with said reference edge.

References Cited by the Examiner

UNITED STATES PATENTS

| 827,239 | 7/1906 | Hoy | 33—106 |
| 2,087,666 | 7/1937 | Holt | 33—143 |
| 2,957,247 | 10/1960 | Brown et al. | 33—147 |
| 3,101,550 | 8/1963 | Helferich | 33—143 |

FOREIGN PATENTS

| 167,267 | 12/1950 | Austria. |
| 435,511 | 12/1911 | France. |
| 475,353 | 2/1915 | France. |
| 1,282,392 | 12/1961 | France. |
| 565,544 | 11/1944 | Great Britain. |
| 850,564 | 10/1960 | Great Britain. |
| 252,557 | 10/1948 | Switzerland. |

LEONARD FORMAN, *Primary Examiner.*

H. N. HAROIAN, *Assistant Examiner.*